US009344127B2

(12) United States Patent
Hone et al.

(10) Patent No.: US 9,344,127 B2
(45) Date of Patent: May 17, 2016

(54) GRAPHENE RESONATOR BASED MIXER-FIRST RECEIVER ON CMOS FOR DIGITALLY CONTROLLED AND WIDELY TUNABLE RF INTERFACE

(71) Applicant: THE TRUSTEES OF COLUMBIA UNIVERSITY IN THE CITY OF NEW YORK, New York, NY (US)

(72) Inventors: James Hone, New York, NY (US); Alyosha Molnar, Ithaca, NY (US); Changhyuk Lee, Ithaca, NY (US); Sunwoo Lee, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 14/552,449

(22) Filed: Nov. 24, 2014

(65) Prior Publication Data

US 2015/0194991 A1    Jul. 9, 2015

Related U.S. Application Data

(60) Provisional application No. 61/907,680, filed on Nov. 22, 2013.

(51) Int. Cl.
| | | |
|---|---|---|
| *H04B 1/10* | (2006.01) | |
| *H04B 1/12* | (2006.01) | |
| *H04B 15/00* | (2006.01) | |
| *H04L 25/03* | (2006.01) | |
| *H01L 21/314* | (2006.01) | |
| *H04L 27/26* | (2006.01) | |

(52) U.S. Cl.
CPC .............. *H04B 1/123* (2013.01); *H04B 15/005* (2013.01); *H01L 21/3142* (2013.01); *H04L 25/03038* (2013.01); *H04L 27/2647* (2013.01)

(58) Field of Classification Search
CPC ..................... H04L 25/03038; H04L 27/2647; H04L 21/3142
USPC ......................................................... 375/350
See application file for complete search history.

(56) References Cited

U.S. PATENT DOCUMENTS

| | | | |
|---|---|---|---|
| 8,390,388 B1* | 3/2013 | Hoffmann et al. ............ | 331/154 |
| 2007/0287011 A1* | 12/2007 | DeHeer ...................... | 428/411.1 |
| 2010/0214034 A1* | 8/2010 | Peng et al. .................... | 331/154 |
| 2010/0321124 A1* | 12/2010 | Rangarajan et al. .... | 331/117 FE |
| 2011/0240946 A1* | 10/2011 | Miao et al. ........................ | 257/3 |
| 2012/0161832 A1* | 6/2012 | Lee et al. ........................ | 327/156 |
| 2012/0304776 A1* | 12/2012 | Novotny ......................... | 73/668 |
| 2013/0053711 A1* | 2/2013 | Kotlanka et al. .............. | 600/505 |
| 2013/0160550 A1* | 6/2013 | Hentz .............................. | 73/579 |
| 2013/0272951 A1* | 10/2013 | Hiura et al. ................... | 423/448 |

(Continued)

*Primary Examiner* — Santiago Garcia
(74) *Attorney, Agent, or Firm* — Baker Botts L.L.P.

(57) ABSTRACT

A radio frequency (RF) receiver including a baseband circuitry. The baseband circuitry can include a graphene nano-electro-mechanical (GNEMS) based system, a receiver, and a front-end mixer. The GNEMS based system can include a source, a drain, a gate and a nano-scale suspended graphene resonator. The graphene resonator can be suspended between the source and the drain. The receiver circuitry can be disposed on the baseband and configured to receive an RF signal. The front-end mixer can be disposed between the GNEMS based system and the receiver circuitry. The baseband circuitry can be configured such that an incoming signal sees frequency selective impedance at the receiver circuitry.

17 Claims, 7 Drawing Sheets

(56) References Cited

U.S. PATENT DOCUMENTS

| | | | |
|---|---|---|---|
| 2013/0309776 A1* | 11/2013 | Drndic | G01N 27/26 436/94 |
| 2014/0024917 A1* | 1/2014 | McMahon et al. | 600/407 |
| 2014/0098845 A1* | 4/2014 | Egard et al. | 375/219 |
| 2014/0171009 A1* | 6/2014 | Tohidian et al. | 455/326 |

\* cited by examiner

1) Capacitive Transduction Mode 201

2) Transconductance-based Transduction Mode 202

303 GNEMS as a Degeneration Impedance $$g_m = \frac{g_{mo}}{1+Z_s \times g_{mo}}$$

302 Cascode Configuration To Improve GNEMS Gain $$g_m = \frac{1}{Z_s}$$

301 GNEMS as a Transimpedance Load

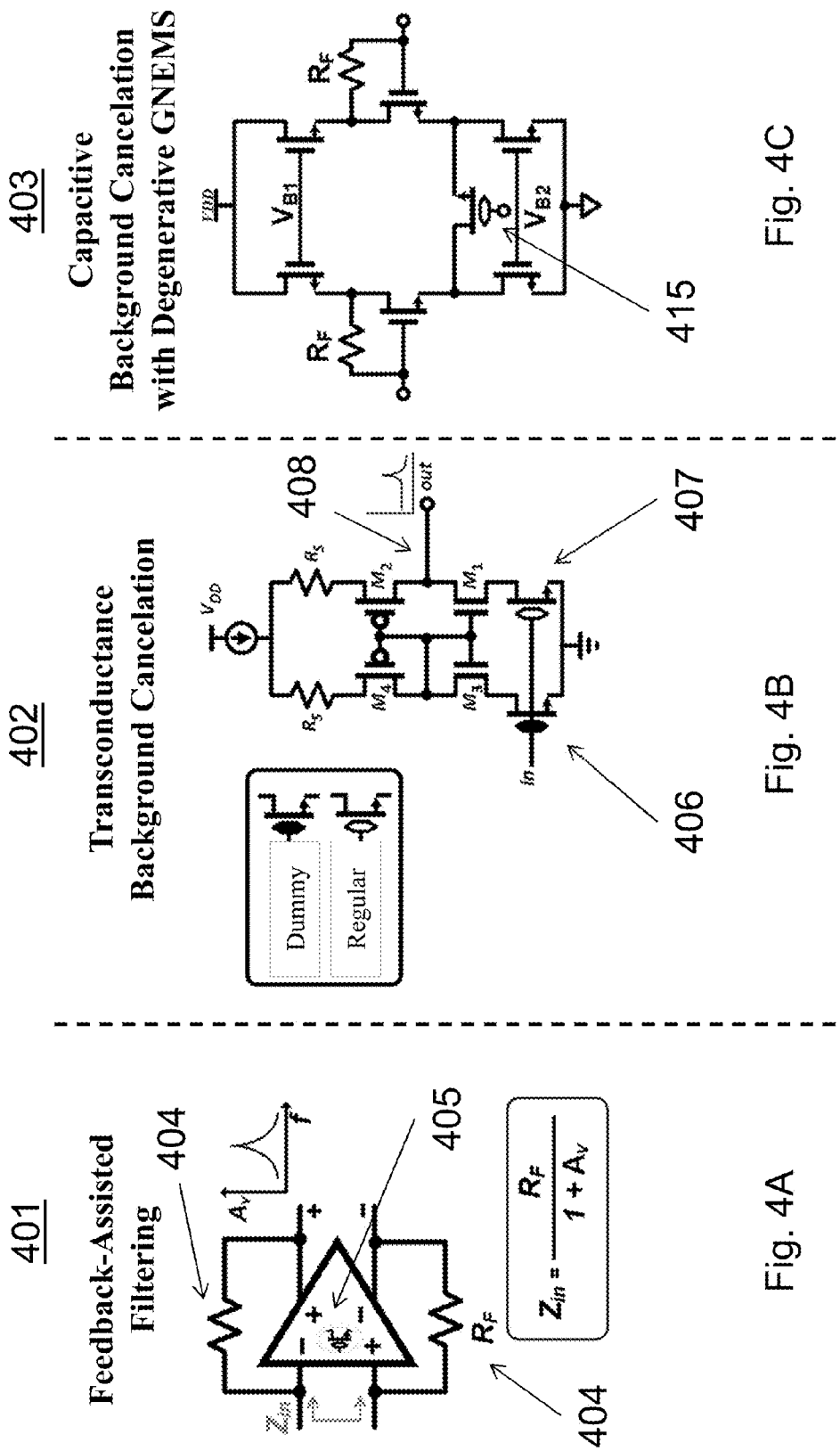

GRAPHENE RESONATOR BASED MIXER-FIRST RECEIVER ON CMOS FOR DIGITALLY CONTROLLED AND WIDELY TUNABLE RF INTERFACE

CROSS-REFERENCE TO RELATED APPLICATIONS

This application claims priority to U.S. Provisional Application Ser. No. 61/907,680, filed on Nov. 22, 2013, which is incorporated by reference herein in its entirety.

STATEMENT REGARDING FEDERALLY SPONSORED RESEARCH

This invention was made with government support under Grant No. ECCS 0925670 awarded by the National Science Foundation. The government has certain rights in the invention.

BACKGROUND

An input radio spectrum into an antenna can contain both an intended signal and several, potentially larger, unwanted blockers that can saturate the receiver and reduce its sensitivity. Furthermore, congestion in the wireless frequency spectrum makes it desirable for receiver architecture to be flexible, capable of multi-band operations.

Certain radio receiver architectures contain a family of discrete off-chip filters or high order LC filters that are not favorable in terms of area or cost. Furthermore, front-end filters for certain radio frequency receivers can be bulky and not flexible.

Graphene nano-electro-mechanical (GNEMS) resonators can be more than an order of magnitude smaller (e.g., about 10 $\mu m \times 10$ $\mu m$) than certain conventional filters (e.g., film bulk acoustic resonators (FBAR), which can be about 100 $\mu m \times 100$ $\mu m$). Furthermore, the resonant frequency of GNEMS can be widely tuned, for example, up to 400%.

While the resonant frequency of GNEMS can be scaled into few GHz's range, it is sometimes desirable to operate GNEMS in a low MHz regime in order to exploit its benefits. However, there are circuit topologies such as passive mixer-first receiver which can be improved when combined with small, cheap, and flexible filtering elements like GNEMS.

Consequently, recognizing a need for radio receiver circuits and methods that can achieve a high quality factor, low area, low cost, and low power while maintaining a high tunability, a combination of conventional circuit topologies with unconventional, i.e., MEMS or NEMS, can provide a receiver with such properties.

SUMMARY

The presently disclosed subject matter provides radio receivers that are digitally controlled and tunable and can achieve high quality factor, high tunability, low area, low cost, and low power.

In an exemplary embodiment, a radio frequency (RF) receiver is provided. The RF receiver can include a baseband circuitry. The baseband circuitry can include a graphene nano-electro-mechanical (GNEMS) based system, a receiver circuitry, and a front-end mixer. The GNEMS based system can include a source, a drain, a gate and a nano-scale suspended graphene resonator, the graphene resonator suspended between the source and the drain. The receiver circuitry can be disposed on the baseband and configured to receive an RF signal. The front-end mixer can be disposed between the GNEMS based system and the receiver circuitry. The baseband can be configured such that an incoming signal sees frequency selective impedance at the receiver circuitry.

In some embodiments, the GNEMS based system can be a baseband filter. The baseband circuitry can be configured such that the GNEMS based system operates in capacitive transduction mode. The baseband circuitry can be configured such that the GNEMS based system operates in transconductance-based transduction mode. In some embodiments the baseband circuitry can be configured such that the GNEMS based system operates as a transimpedance load. The baseband circuitry can be configured such that the GNEMS based system receives an active load in cascode configuration. The baseband circuitry can be configured such that the GNEMS based system acts as active degeneration impedance.

In some embodiments the baseband circuitry can include a feedback. The baseband circuitry can include a dummy device configured to cancel trans-conductive background noise (feed-through). In some embodiments, the baseband circuitry can be a non-GNEMS device with similar background characteristics. The baseband circuitry can include capacitive background cancellation circuitry using a dummy device or non-GNEMS device with similar background characteristics.

According to another aspect of the disclosed subject matter, methods for receiving a RF signal at a system are provided. The method can include receiving a wanted signal and an unwanted signal in a receiver circuitry. The method can include passing the wanted signal through a front-end mixer. The method can include feeding the wanted signal into a GNEMS based system. The unwanted signal can be rejected at the receiving circuitry.

In some embodiments, the method can include feeding the signal through dual path noise cancelling circuitry. The method can include feeding the signal through higher order filter architectures. The signal can be fed through higher order filter architectures by implementing both the frequency selectivity of single-pole filters of conventional passive mixer-first receiver and the frequency selectivity of multi-pole GNEMS filters or circuits based on GNEMS.

The accompanying drawings, which are incorporated in and constitute part of this specification, are included to illustrate and provide a further understanding of the method and system of the disclosed subject matter. Together with the description the drawings serve to explain the principles of the disclosed subject matter.

BRIEF DESCRIPTION OF THE FIGURES

FIGS. 4 (A)-(C) illustrate example system level approaches that can complement GNEMS resonators.

DETAILED DESCRIPTION

The techniques provided herein can be used to realize a graphene resonator based mixer-first receiver on CMOS for digitally controlled and widely tunable RF interface. For example, the disclosed subject matter can be used for radio receivers that are digitally controlled and tunable. The radio receivers can receive an RF signal, passing the signal through a front-end mixer, down-convert the signal to baseband, and feed the signal into a GNEMS resonator.

Figure 1:
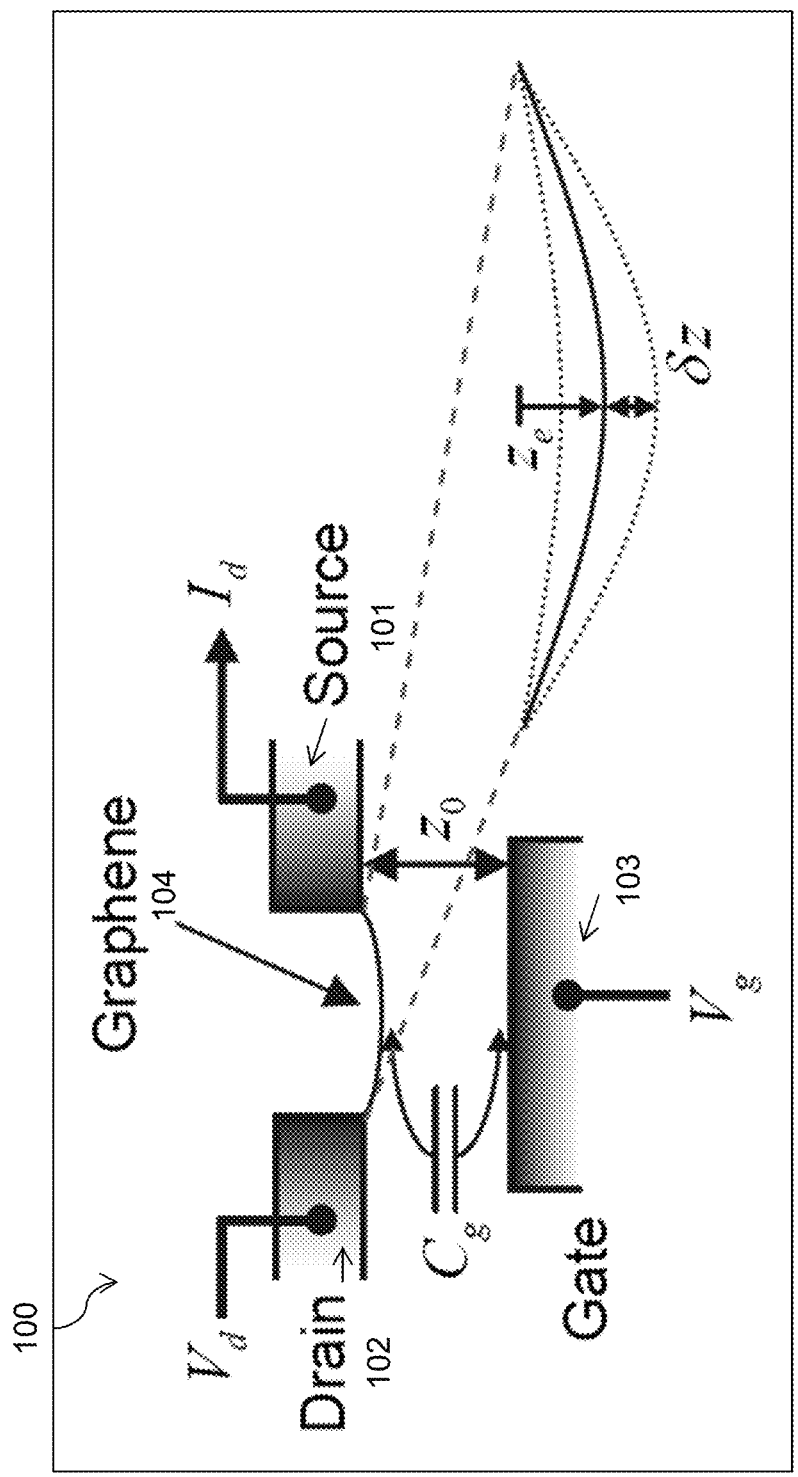
FIG. 1 illustrates an example GNEMS resonator in accordance with the disclosed subject matter.

FIG. 1 shows, for the purpose of illustration and not limitation, a GNEMS resonator 100. The GNEMS resonator can include a source 101, a drain 102, and a gate 103, all of which can be between sub-micron to a few tens of micrometers in size. The GNEMS resonator can include a nano-scale suspended graphene membrane 104. The radius of the nano-scale suspended graphene membrane 104 can be between sub-micron to a few tens of micrometers. The graphene resonator 104 can be configured to be resonated by an electro force applied to the gate 103. Input power can range from less than −70 dBm to higher than 0 dBm, to drive linearly as well as non-linearly. A passive mixer-first receiver system in general operates based on transparency and input impedance modulation. An incoming signal at an antenna is not down-converted into baseband and processed, rather, the incoming signal sees frequency-selective input impedance at the antenna. This can be due to the transparency of baseband circuitry through the passive mixer. In other words, unwanted, out-of-band signals can be rejected at the antenna, due to the impedance mismatch (frequency selective) seen at the antenna. GNEMS resonators, including source, drain, gate, and a suspended graphene membrane, can offer small device footprint, low power, multi-pole roll-off, as well as large tunability.

Referring to FIGS. 2A-D, for the purpose of illustration and not limitation, GNEMS can operate in a capacitive mode (201), as well as a transconductance mode (202). While the operation principle of the capacitive mode (201) can be the similar to conventional MEMS, GNEMS can withstand higher mechanical compliance and can be made to have much higher suspended graphene area-to-gate ratio, which can enhance its transduction efficiency. The induced current in the capacitive mode can be provided by equation 1.

$$\tilde{I} = j\omega C_{tot}\tilde{V}_g - j\omega \frac{\tilde{z}}{z_0} C_g V_g \quad (1)$$

The first term represents feed-through current, which can occur due to the parallel plate-like capacitance formed between graphene and the gate. The first term is therefore not related to graphene's mechanical vibration. The second term is due to the displacement current generated by the mechanical resonance of graphene.

Figure 2A:
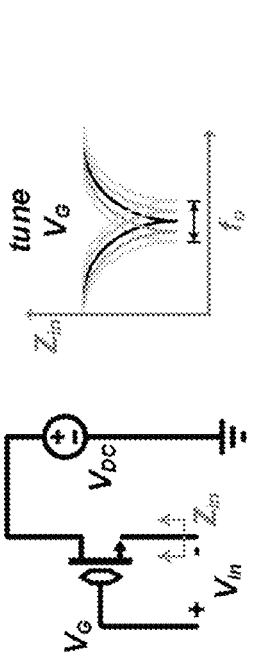
FIGS. 2 (A)-(D) illustrates two exemplary modes of operation in GNEMS resonators, according to embodiments of the disclosed subject matter.
Figure 2B:
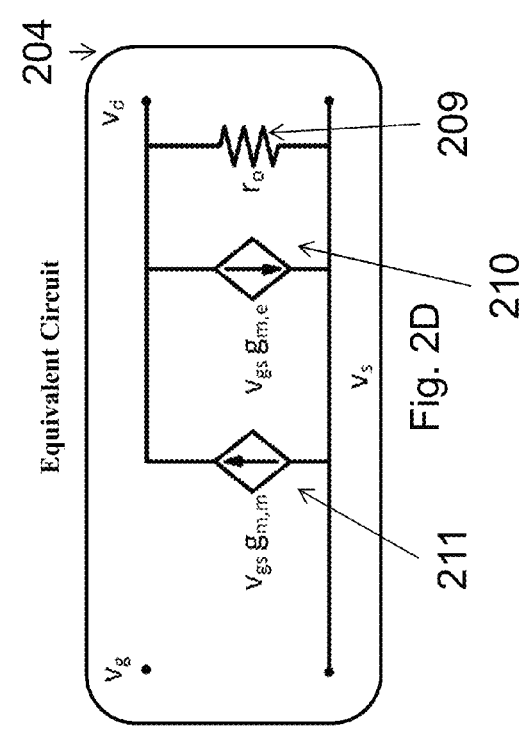
Figure 2C:
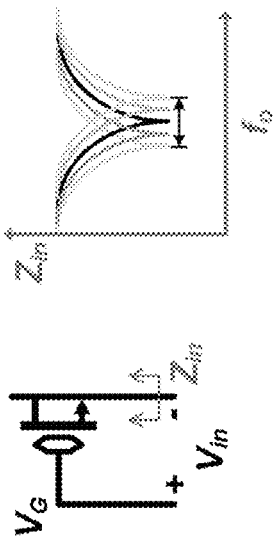

The equivalent circuit 203 is illustrated in FIG. 2B, for the purpose of illustration and not limitation. The first feed-through current term can be depicted by a parasitic capacitance $C_O$ (capacitor 208). The second displacement current term can be depicted by an equivalent R-L-C network circuit having resistance $R_m$ (resistor 205), Capacitance $C_m$ (capacitor 206), and inductance $L_m$ (inductor 207), where $L_m$ and $C_m$ describe the resonant frequency of the system, while $R_m$ describes the loss in the system.

In the transconductance mode (202), the signal level of GNEMS can further increase, which can be proportional to the bias current through the graphene source-drain channel, gate bias, and its field-effect mobility. The current can be provided by equation 2.

$$\tilde{I} = V_d \frac{dG}{dV_g}\tilde{V}_g - V_g \frac{dG}{dV_g}\frac{\tilde{z}}{z_0}V_g \quad (2)$$

Figure 2D:
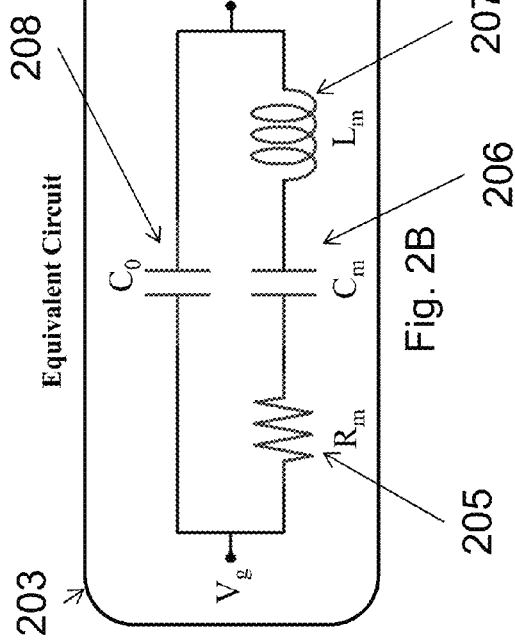

The first term in equation 2 depicts a current term that is not related to the mechanical motion of graphene—it occurs purely due to AC modulation at the gate, which modulates the carrier density of the graphene channel (referred to herein as transconductance (gm) background current). The second term of equation 2 depicts a current term due to the mechanical motion of graphene. The second term of equation 2 varies from the second term in equation 1 because the second term in equation 2 shows that the resonance, mechanical vibrations, of graphene is amplified by the gate bias, drain bias, and its field-effect mobility. FIG. 2D illustrates, for the purpose of illustration and not limitation, the equivalent circuit (204). The circuit includes an output resistance $r_o$ (resistor 209) in parallel with controlled current sources (210) and (211) each providing current $v_{gs}g_{m,e}$ for gm background and $v_{gs}g_{m,e-m}$ for amplified resonance, respectively.

While GNEMS in its capacitive mode (201) can be implemented as a 2-port filtering element, similar to an R-L-C type filter, its transconductance mode (202) can allow for a flexible implementation to be adapted as part of conventional CMOS topology. For example: 1) GNEMS resonator gain can be improved in cascode (including folded configuration); 2) a GNEMS resonator can be used as a frequency sensitive output impedance in common source/drain/gate configuration of a transistor; 3) a GNEMS resonator can be used as a frequency sensitive degeneration impedance in common source/drain/gate configuration of a transistor; and 4) transconductance background can be eliminated by employing a dummy device whose background signal can be used for the cancelation, to further enhance signal-to-background ratio. Such techniques can be used with GNEMS, and other transconductance-based NEMS or MEMS devices, for example, MoS2 or Si based resonators with similar device configuration. For example, such techniques can be used any of the devices presented herein.

A feedback system can be made where the first stage provides a sufficient gain to provide sufficiently low noise figure for the system, and the second stage provides tunable frequency selectivity based on GNEMS, followed by an optional buffer before closing the loop as needed. The feedback system can be made whether the GNEMS is implemented as a capacitive filter or transconductance based filter, and with or without the supporting circuitries described above. GNEMS can be used as a notch or pass filter, based on the phase settings within the loop. The notch or pass filter can be applied to the single-pole filter that conventional mixer-first receiver designs can include. The addition of frequency notching of GNEMS can allow the receiver to have higher order filter roll-offs or selective notching within a pass-band, to make the receiver more flexible and programmable. The feedback scheme can be applied to other resonant systems to improve its frequency characteristics.

Figure 3C:
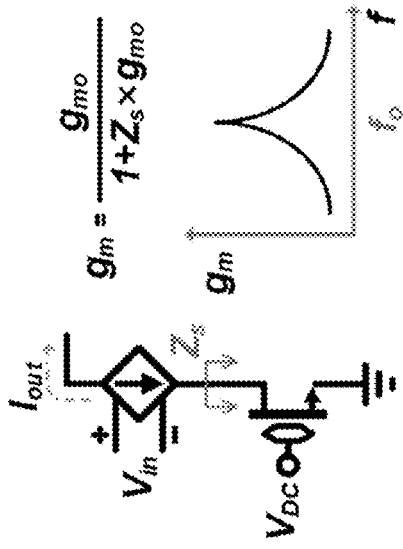
FIGS. 3 (A)-(C) illustrate exemplary topologies that can complement GNEMS resonators.
Figure 3B:
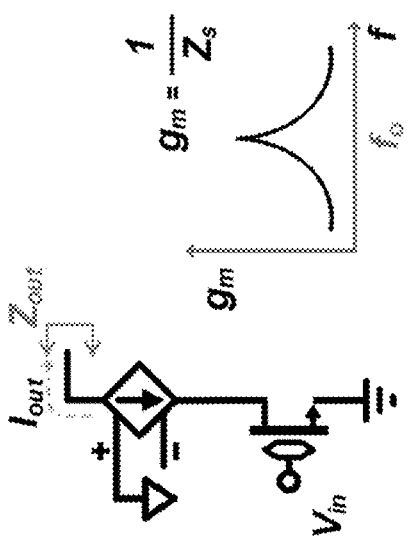
Figure 3A:
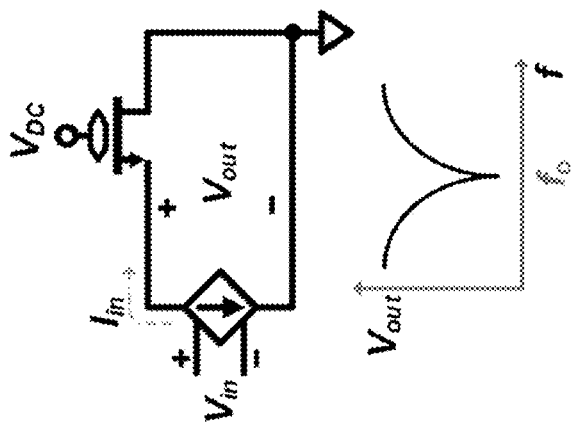

FIGS. 3A-C show, for the purpose of illustration and not limitation, basic topologies that can complement GNEMS resonators. For example, GNEMS resonators can be used as a frequency-selective trans-impedance load (301). In such a configuration, overall circuitry can behave as a tunable RF filter having load impedance that is frequency-dependent. This can make overall gain frequency-dependent as desired. In some embodiments, GNEMS resonators can be used in a cascode configuration to improve GNEMS gain (302). GNEMS resonators can have an active load in cascode configuration (i.e., in series) (including folded) to improve its gain, as noted above. The overall circuitry can still act as a tunable RF filter, similar to the above transimpedance load configuration (301), however with improved gain. In some embodiments, GNEMS can be used as a degeneration impedance (303) to improve system transconductance. As the degeneration impedance has frequency selectivity, the overall circuitry gain can be accordingly modified, acting as a tunable RF filter.

FIGS. 4A-C show, for the purpose of illustration and not limitation, exemplarily system level approaches that can complement GNEMS resonators. For example, and with reference to FIG. 4A, feedback-assisted filtering can be used with a GNEMS-based amplifier (401) where feedback from the GNEMS resonator based amplifier (405) can be provided through resistors (404), having resistance $R_f$. Sufficient gains, for example, but not limited to, up to 40 dB for a low noise figure, can be provided through this architecture where tunable frequency selectivity can be attained. The impedance can be governed by the feedback impedance and the amplifier gain, which can be frequency selective and tunable, as the amplifier is based on, but not limited to, GNEMS.

Referring to FIG. 4B, in some embodiments, trans-conductance background cancelation can be used to complement GNEMS (402). The trans-conductive background of GNEMS can be canceled out with a dummy device (406), which can be identical to the device of interest (407), however the graphene channel is not suspended, or the channel is fully covered by SU-8 or other polymers or oxides. Since the dummy device will only exhibit non-mechanically induced signals (i.e., purely electrical), that is the same or similar in magnitude as the feed through (transconductive background) current of the device of interest (407), when the outputs from devices are combined or subtracted, one can obtain pure (or close to) mechanically induced signal as desired (408). This can provide an increase of the signal-to-background ratio (SBR).

Referring to FIG. 4C, in some embodiments, capacitive background cancelation with degenerative GNEMS can also be provided (403). In such a configuration, similar cancelation technique used for the trans-conductive background cancelation described above can be implemented using on only one device (415) due to the symmetry between the source and drain electrodes with respect to the gate electrodes. Since capacitive scheme can be seen as a two-port network, source-to-gate and drain-to-gate path are identical. Additionally, techniques such as degeneration impedance can be applied at the same time to achieve improved system transconductive while preserving frequency selective characteristics.

Figure 5:
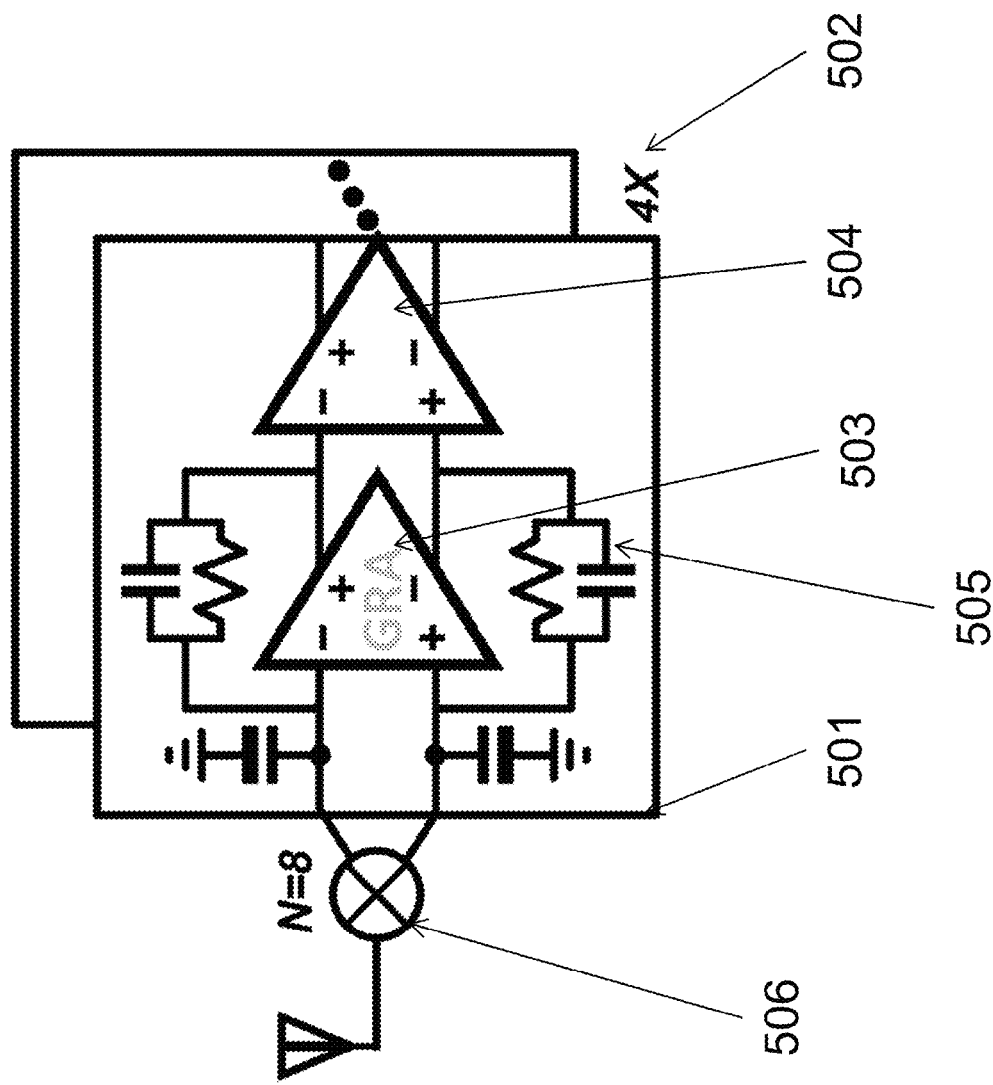
FIG. 5 illustrates an example GNEMS resonator in combination with a passive mixer-first receiver.

FIG. 5 shows, for the purpose of illustration and not limitation, GNEMS in combination with a passive mixer-first receiver. Following the antenna, passive mixer topographically precedes the baseband circuitry. GNEMS or GNEMS-based circuitry similar, but not limited to, the circuitries described above, can be used in the baseband. To be integrated with a passive mixer-first receiver, GNEMS-based circuitries need to provide four-phase filtering responses (502)—eight in total to achieve the needed differential operations (506). This can be accomplished with GNEMS-based topology (501), which can include GNEMS-based amplifier (503) with tunable frequency selectivity, along with optional buffer (504), and feedback (505) as needed. This topology can be more economical compared to other methods, because complementary circuitries can be embedded beneath GNEMS resonators. Furthermore, and as noted above, the GNEMS resonators can occupy less area than other filtering elements such as FBARs. The frequency tunability of GNEMS resonators add an additional dimension of flexibility to the system. The techniques described herein can be used in conjunction with other known filtering elements, for example FBARs, Si MEMS, and other suitable circuit elements, to improve system performances. Such filtering elements can benefit from corresponding, customized complementary circuits (in a similar manner GNEMS benefitted, as described above), for example, heterogeneous circuit topologies.

When GNEMS is combined with a passive mixer-first receiver design, where GNEMS resonators can take part in its baseband circuitry due to the transparency of passive mixer-first receiver design, from the antenna, the baseband characteristics can be up-converted by the mixer frequency. As previously noted, this does not indicate that signals (wanted and unwanted) are mixed down and process in the baseband. Rather, those signals see the up-converted frequency characteristics of the baseband from the antenna, and the unwanted (out of band) signals are rejected at the antenna, without intruding into the baseband. Therefore, GNEMS resonators can operate at lower frequency (<10's MHz), but at an antenna, an incoming signal can see the baseband characteristics up-converted by the mixer frequency (few GHz). This can mitigate a difficulty in frequency scaling in GNEMS or other relevant MEMS or NEMS systems.

Furthermore, the bandwidth of a GNEMS resonator can be preserved through the transparency. Therefore, an effect quality factor of a GNEMS resonator implemented in a passive mixer-first receiver, defined as the ratio of center frequency to bandwidth, can be higher than the intrinsic quality factor of the GNEMS resonator. Thus, the quality factor can increase by the ratio of the resonant frequency of the GNEMS resonator to the mixer frequency. For example, a GNEMS resonator with 10 MHz resonant frequency with quality factor of 100 will have an effective quality factor of 10,000 when implemented in a passive mixer-first receiver with a mixer frequency of 1 GHz. Additionally, the frequency tunability of a GNEMS resonator can be preserved. For example, a GNEMS resonator with 10 MHz resonant frequency with an electro-static frequency tunability of 1 MHz per volt can have 1 MHz per volt frequency tunability after implanted in the passive mixer-first topology. Non-linearity and high motional impedance of GNEMS resonators can also be improved when combined with other conventional circuit topologies in the baseband.

Figure 6:
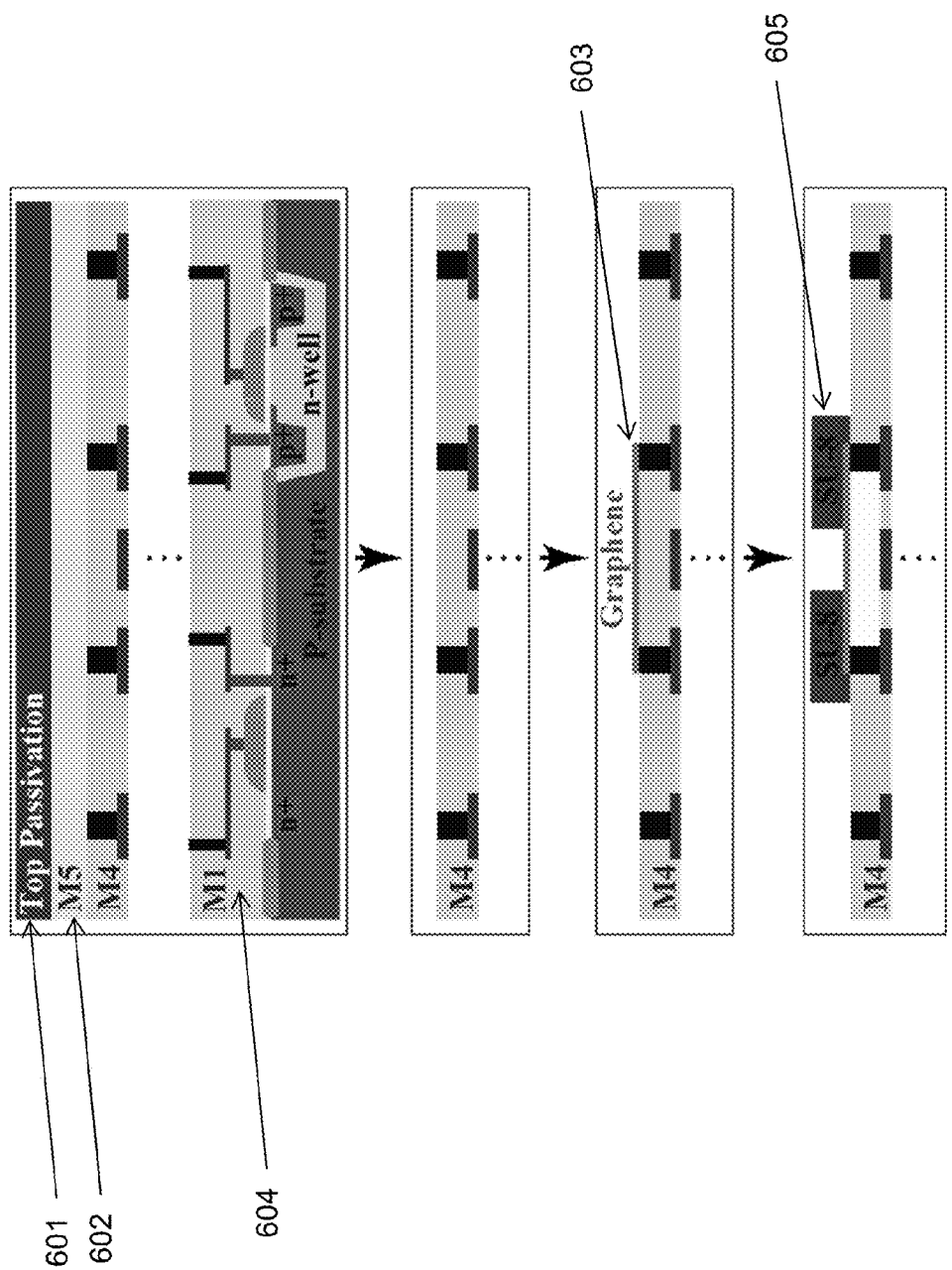
FIG. 6 illustrates an example GNEMS array and passive mixer-first receiver that can be realized on a single CMOS die, in accordance with an exemplary embodiment of the disclosed subject matter.

Referring to FIG. 6, for the purpose of illustration and not limitation, according to another aspect of the disclosed subject matter, a method is provided for realizing a GNEMS array and passive mixer-first receiver on a single CMOS die. An optional top passivation (601), which can be a dielectric, for example, various types of nitride of oxide such as silicon nitride or silicon, can be etched away using wet- (i.e., chemical) or dry- (i.e., plasma) etch, while the top metal (602) can be used as an etch-stop. The top metal (602), for example aluminum, copper or other suitable metals, can act as a sacrificial layer, and can be wet- or dry-etched. This can leave a smooth surface of inter-level-dielectric (ILD) made of, for example, dielectrics such as silicon oxide or silicon nitride and via made of, for example, tungsten, copper or other suitable metals, which can help establish connections between source and drain of graphene (603) and control circuits beneath (604). The graphene (603) can then be transferred using wet or dry transfer with or without polymer support. The graphene (603) can be patterned using photo or electron lithography followed by plasma-etch using gases, for example, oxygen or using ion beam, sputtering, or a wet chemical etch. Metal deposition can be done to bolster the connection between graphene and the vias (source and drain) using metals such as palladium, gold, copper, aluminum or other suitable metals. SU-8 605 or other non-HF soluble clamping made of polymers or dielectrics can be placed on top of graphene before HF or BOE release, followed by critical point dry (CPD).

In some embodiments, a method can include building an array of such GNEMS resonators using the lithography method described above. Additionally, in some embodiments, control circuits for the GNEMS resonators array along with complementary RF circuits, for example passive mixer-first receivers, can be built on a lower layers of the CMOS chip. This can allow three-dimensional non-destructive integration of both technologies. GNEMS can be built through a post processing on conventional silicon-CMOS back-end metal stack.

Figure 7:
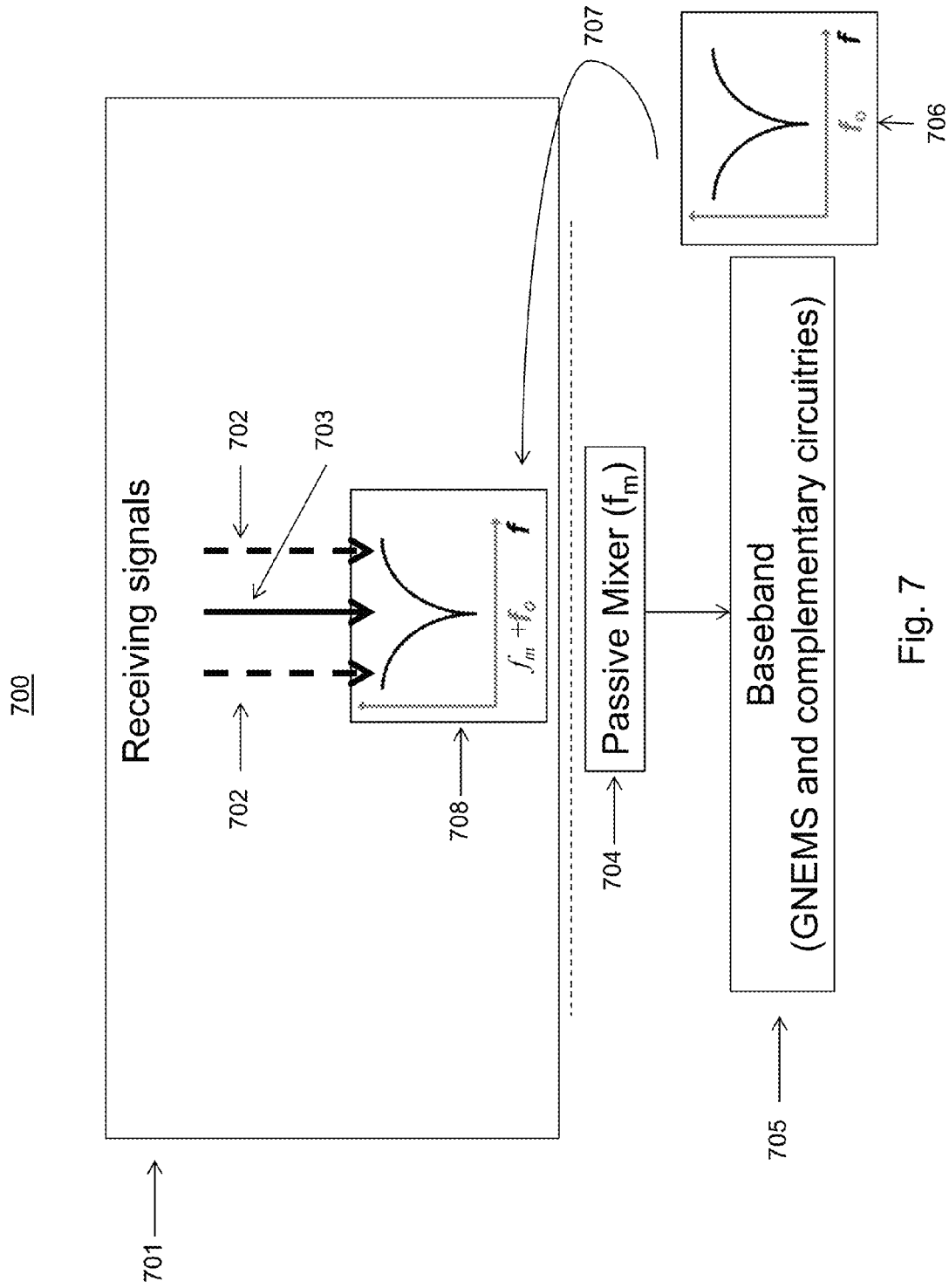
FIG. 7 illustrates an example method for receiving an RF signal.

FIG. 7 shows, for the purpose of illustration and not limitation, a method for receiving a radio frequency signal (700). The method can include receiving signals (wanted and unwanted) in a receiver circuitry through an antenna (701). As an example, and not by way of limitation, a wanted signal is labeled 703 while unwanted signals are labeled 702. The baseband (705), includes GNEMS and other complementary circuitries, follows the passive mixer (704). Due to transparency (707), the input impedance seen by the incoming signals (702 and 703) has the frequency selectivity of the baseband alone (706) up-converted by the mixer frequency (704). This can cause the frequency response (708). Therefore, the unwanted signal (702) can be blocked before passing through the mixer (704). The desired signal (703) can pass through the mixer (704) through the signal chain. The receiver circuitry can include any of the circuit designs described herein above.

The baseband or passive mixer circuitry can include any of the circuit designs described herein above. In some embodiments, the method can include feeding the signal through dual path noise cancelling circuitry. In some embodiments, the method can include feeding the signal through higher order filter architectures.

The description herein merely illustrates the principles of the disclosed subject matter. Various modifications and alteration to the described embodiments will be apparent to those skilled in the art in view of the teachings herein. Accordingly, the disclosure herein is intended to be illustrative, but not limiting, of the scope of the disclosed subject matter.

While the disclosed subject matter is described herein in terms of certain exemplary embodiments, those skilled in the art will recognize that various modifications and improvements can be made to the disclosed subject matter without departing from the scope thereof. Moreover, although individual features of one embodiment of the disclosed subject matter can be discussed herein, or shown in the drawing of one of the embodiments and not in another embodiment, it should be apparent that individual features of one embodiment can be combined with one or more features of another embodiment or features from a plurality of embodiments. Thus, the foregoing description of specific embodiments of the disclosed subject matter has been presented for purposes of illustration and description. It is not intended to be exhaustive or to limit the disclosed subject matter to those embodiments disclosed.

The invention claimed is:

1. A radio frequency (RF) receiver, comprising:
a baseband circuitry comprising:
a graphene nano-electro-mechanical (GNEMS) based system including a source, a drain, a gate and a nano-scale suspended graphene membrane resonator, the graphene membrane resonator suspended between the source and the drain and configured to be resonated by an electro force applied to the gate;
a receiver circuitry disposed on the baseband and configured to receive an RF signal; and
a front-end mixer disposed between the GNEMS based system and the receiver circuitry;
wherein the baseband circuitry is configured such that an incoming signal sees frequency selective impedance at the receiver circuitry.

2. The RF receiver of claim 1, wherein the GNEMS based system is a baseband filter.

3. The RF receiver of claim 1, wherein the baseband circuitry is configured such that the GNEMS resonator operates in capacitive transduction mode.

4. The RF receiver of claim 1, wherein the baseband circuitry is configured such that the GNEMS based system operates in transconductance-based transduction mode.

5. The RF receiver of claim 1, wherein the baseband circuitry is configured such that the GNEMS based system operates as a transimpedance load.

6. The RF receiver of claim 1, wherein the baseband circuitry is configured such that the GNEMS based system receives an active load in cascade configuration.

7. The RF receiver of claim 1, wherein the baseband circuitry is configured such that the GNEMS based system acts as active degeneration impedance.

8. The RF receiver of claim 1, wherein the baseband circuitry further comprises a feedback.

9. The RF receiver of claim 1, wherein the baseband circuitry further comprises a dummy device configured to cancel trans-conductive background noise.

10. The RF receiver of claim 1, wherein the baseband circuitry further comprises capacitive background cancellation circuitry.

11. The RF receiver of claim 1, wherein the baseband circuitry further comprises capacitive background cancellation circuitry and a degenerative GNEMS based system.

12. A method for receiving a radio frequency (RF) signal at a system, comprising:
receiving a wanted signal and an unwanted signal in a receiver circuitry;
passing the wanted signal through a front-end mixer;
feeding the wanted signal into a graphene nano-electro-mechanical (GNEMS) based system including a source, a drain, a gate and a nano-scale suspended graphene membrane resonator, the graphene membrane resonator suspended between the source and the drain and configured to be resonated by an electro force applied to the gate; and
wherein the unwanted signal is rejected at the receiving circuitry.

13. The method of claim 12, wherein the system comprises:
a baseband circuitry comprising:
the GNEMS based system;
a receiver circuitry disposed on the baseband and configured to receive an RF signal; and
a front-end mixer disposed between the GNEMS based system and the receiver circuitry;

wherein the baseband circuitry is configured such that an incoming signal sees frequency selective impedance at the receiver circuitry.

14. The method of claim 12, further comprising feeding the signal through dual path noise cancelling circuitry.

15. The method of claim 12, further comprising feeding the signal through higher order filter architectures.

16. The RF receiver of claim 1, wherein the graphene membrane resonator has a radius between about 1 micron and about 50 microns.

17. The method of claim 12, wherein the graphene membrane resonator has a radius between about 1 micron and about 50 microns.

* * * * *